3,085,897
METHOD OF QUICK-SETTING PROTEIN CONTAINING COATINGS BY FUMING WITH A NITROGENOUS ALKALINE GAS
William J. Priest and Joseph S. Yudelson, Rochester, N.Y., assignors to Eastman Kodak Company, Rochester, N.Y., a corporation of New Jersey
No Drawing. Filed Aug. 5, 1959, Ser. No. 831,701
8 Claims. (Cl. 117—34)

This invention relates to a coating method in which quick setting is obtained, characterized by the use of latices of a pH-convertible polymers, which after application to a surface are fumed with an alkaline gas, such as ammonia. The invention is especially useful for the application of photographic emulsion coatings to a supporting surface.

Many polymers have been suggested as vehicles for silver halides in photographic emulsions. A large portion of the polymer thus suggested have been carboxyl-containing polymers whose ammonium or alkali metal salts are soluble in water. For instance, British Patent No. 749,801 has taught the use of partially hydrolyzed alkali metal salts of polyacrylate and polymethacrylate esters as vehicles for silver halides. French Patent No. 1,117,490 indicates that photographic emulsions can be made in which the vehicle is a copolymer of acrylonitrile and acrylic acid or some other unsaturated polymerizable carboxylic acid. U.S. Patent No. 2,768,080 discloses the use of certain terpolymers containing carboxyl groups as acceptable silver halide vehicles, particularly in combination with other water soluble polymeric species such as gelatin. In all of these instances the polymers are utilized in the water soluble form in which they are mixed with the silver halide grains and are generally intended merely as extenders or substitutes for the conventionally used vehicle, gelatin. The mode of their employment shows no substantial difference from conventional methods of making and coating gelatin-silver halide emulsions.

One object of our invention is to provide vehicle-silver halide mixtures having higher total solids contents than previous compositions where the water soluble form of the polymer has been used. Another object of our invention is to provide a method for forming coatings, particularly on non-porous, non-water absorbent (non-pervidus) surfaces, in which the viscosity of the coating is rapidly increased to avoid loss of the coating in any of the conventional drying processes. Other objects of our invention will appear herein.

We have found that, if the vehicle or coating material is a polymer having a substantial carboxyl content therein and used in an aqueous coating composition in the form of a latex in which the particle size is less than 1 micron, a high total solids content is possible without measurably affecting the flowability of the coating composition. We have found that, when the coating of such composition after application to a surface which does not absorb the water therefrom (water-impervidus) is fumed with an alkaline gas, such as ammonia, the viscosity of the coating is measurably increased and setting thereof is obtained. By means of our invention, coating compositions having contents of polymer up to almost 60% may be employed. If the coating composition is in latex form, such compositions can carry relatively large concentrations of silver halide without affecting the coating properties of the compositions. Yet after coatings of those compositions have been applied, immediate setting thereof may be obtained without the necessity of any auxiliary material in the coating composition, such as has been necessary in prior setting methods in which ammonia fuming has been used. Our invention also avoids the use of mixed solvents and modified coating equipment required for pH-convertible polymers which when made alkaline, and converted to the salt form, only swell in water and require addition of an alcohol, or the like, to cause solution.

The polymers which are useful in accordance with our invention are the copolymers of hydrophobic ethylenically unsaturated monomers with carboxyl-containing monomers. Typical examples of the hydrophobic monomers which can be used in forming polymers for use in our invention are ethylene, propylene, isobutylene, styrene, methylstyrene, vinyl acetate, vinyl chloride, vinyl formate, vinylalkyl ethers, alkyl acrylates, alkyl methacrylates, butadiene, acrylonitrile, water-insoluble alkyl substituted acryl amides, vinylidene chloride, and the like. Examples of carboxyl-containing materials useful for combining with the above in the polymerization are acrylic acid, methacrylic acid, crotonic acid, maleic acid, fumaric acid, itaconic acid, citraconic acid, aconitic acid, half esters or amides of ethylenically unsaturated dibasic acids, and copolymers which contain unsaturated anhydrides such as maleic anhydride.

The polymerization to form the latex useful in the method in accordance with our invention is of the emulsion polymerization type and the pH of the mass in the absence of extraneous acids or bases, is determined by the acid strength of the carboxyl-containing material used. For instance, in most cases where mild acids such as acrylic acid or methacrylic acid are used, the pH will be on the order of 6 or less. When, however, stronger acids such as maleic acid are used, the pH can be less than 3.5. The polymer should not be swollen by water at the pH chosen for coating. Also, the acid strength of the carboxyl-containing monomer and the solubility characteristics of the non-water soluble co-monomer determines the proportion of carboxyl which is needed in the product obtained. However, the range of carboxyl useful for imparting alkali solubility to the polymer will be within the range of 5–50 mol percent oft he total monomeric material employed.

The polymerization is carried out in a latex stabilizer which ordinarily is a surface-active agent useful in an acid system such as recognized in the art as being useful in emulsion polymerization under acid conditions. The non-ionic wetting agents are a class of materials of this type representative of a type of latex stabilizers which are useful in preparing latices by emulsion polymerization processes. In the preparation of the latex, it is ordinarily desirable to have a catalyst present such as a persalt or peroxide compound, as benzoyl peroxide, sodium persulfate, or the like. The resulting latices may have a polymer particle size well below 1.0 micron and the latices thus prepared are adequately stable and can have a solids content within the range of 40–55%. Latices of the copolymer of a mixture of one or more of the hydrophobic unsaturated monomers listed above and one or more of the carboxyl-containing unsaturated acid materials prepared by emulsion polymerization using a latex stabilizer are useful in coating compositions which may be used in coating methods in accordance with our invention.

It is desirable that the pH of the coating mixture is such that the polymer is retained in latex form therein. The pH should be on the acid side and generally it is desirable that it be below 6 for best operations. The latex formed when used in photographic emulsions is mixed with a silver halide dispersion which has been prepared by reacting silver nitrate and an alkali metal halide in an aqueous solution of a suitable peptizer. Some of the peptizers which are useful in preparing silver halide dispersions compatible with latices in accordance with our invention are polyvinyl acetals such as referred to in U.S. Patents Nos. 2,211,323 and 2,286,215; cellulose esters such as referred to in U.S. Patent No. 2,110,491; polyvinyl alcohol referred to in U.S. Patent No. 2,276,323; polyvinyl pyridine referred to in U.S. Patent No. 2,484,456; poly-N-vinyl lactams referred to in U.S. Patent No. 2,495,918; polyacrylamides referred to in U.S. Patent No. 2,541,474; oxidized proteins referred to in U.S. Patent No. 2,691,582; polyethylene oxides described in U.S. Patent No. 2,752,246; polyvinyl amine referred to in British Patent No. 618,175, or gelatin. After the silver halide dispersion has been prepared by a method as described in the prior art, and separated from water soluble salts, it is found that the dispersions, if stable at an acid pH, do not coagulate the latex and are compatible therewith, thereby avoiding objectionable haze in the dried coatings. Emulsions thus prepared may be sensitized or otherwise modified in accordance with known photographic practices. There is a reduced tendency for the polymers operable in our invention to dissolve organic solvent-soluble materials sometimes present in emulsions, such as dyes or other photographic addenda, when the carboxyl-containing polymers are converted to the salt form. In the converted polymer composition (i.e., salt form) phase interfaces, which, when present, cause difficulty by competitive adsorption for photographic addenda, are eliminated by the method of our invention. If phase interfaces are eliminated, the haze, which normally appears when systems of latex dispersed in water soluble polymers are rewet, is absent. In some cases, latex as referred to herein may be desired as the carrier for a pigment such as barium sulfate, titanium dioxide or the like, or used in some other connection in coating operations.

The pH of the coating mixture must be such that the polymer is retained in latex form at the time of coating. Immediately upon coating, the layers thus obtained are fumed with an alkaline gas such as ammonia, methyl amine, or ethyl amine (nitrogenous alkaline gases) which causes the pH of the coating to rise to 8–10 depending on the time of fuming, the thickness of the coating and the concentration of the alkaline gas.

The polymeric part of coating materials in accordance with our invention are copolymers of hydrophobic monomers and unsaturated acids in the form of polymer dispersions in which the particle size is below 1.0 micron. The proportion of carboxyl-containing monomer used should be sufficient to supply adequate carboxyl to the polymer to impart alkali solubility thereto.

The following examples illustrate the applicants invention:

*Example 1*

Twenty grams of a dry negative type photographic emulsion consisting of silver bromoiodide grains made according to the procedures in U.S. Patent No. 2,618,556 of Hewitson et al. were soaked overnight in water and then were redispersed in 50 cc. of water. Sufficient dilute ammonium hydroxide was added to adjust the pH to 7.2. The mixture designated below as A was obtained. Ten grams of an ethyl acrylate-methacrylic acid copolymer latex having an average particle size of 0.1 micron containing about 25 mol percent of acrylic acid and 21% of total solids, prepared by emulsion polymerization using an aryl alkyl sulfonate emulsifier and potassium persulfate catalyst, was adjusted to a pH of 5.5 with a little pyridine and one cc. of a 7% solution of lime process gelatin was added and the resulting mixture was designated B.

Seven grams of mixture A was added to mixture B forming a mass, the viscosity of which is on the order of 10 cps, the composition of which is as follows:

| | Approx. percent |
|---|---|
| Water, 13.9 grams | 76.5 |
| Latex solid, 2.1 grams | 12 |
| Gelatin, .1 grams | 0.5 |
| Silver halide grains, 2.0 grams | 11 |

The resulting mixture remained stable for several hours and was coated at 80° F. on film base using a doctor blade. As the coating is applied it is run into a box containing ammonia fumes. It was found that a good coating was obtained as a result of gelling thereof almost immediately. The coating was dried under a hot air jet while in gelled condition to form a smooth uniform coating.

*Example 2*

A 20% solution of a latex prepared by the emulsion polymerization of a mixture of alkyl methacrylate and methacrylic acid which mixture contained 32% of the acid was mixed with a little normal $NH_4OH$ to impart a pH of 4.5. 0.3 ml. of a surface active agent (tetrasodium-N - (1,2-dicarboxyethyl)-N-octadecyl sulfosuccinamate) was added. This solution was designated "A." In a separate container 4 grams of silver halide grains made as described in Example 1 were mixed with 4 ml. of water. The pH was adjusted to 5 with normal ammonium hydroxide and tetrasodium - N - (1,2-dicarboxyethyl)-N-octadecyl sulfosuccinamate was added. The grain solution was then mixed with the solution designated as "A," and the mass was observed for 4 hours. No sedimentation of grains or coagulation of latex occurred. 5% (based on the weight of polymer) of bis(2,3-epoxypropoxy ethyl)ether was added and the mixture was coated using a doctor blade as a layer of .006 inch thickness onto cellulose acetate film base subbed with gelatin and on polystyrene film base containing a subbing coating of polyethylacrylate coacrylic acid. Upon coating, the mass was immediately fumed with ammonia gas for 10 seconds. At the end of that time the coating had set and was dried in a current of warm dry air without unevenness as a result of the aqueous condition of the emulsion. The total solids content of the coating mixture thus prepared was 28.5%.

*Example 3*

The procedure described in the preceding example was followed using as the latex a suspension of the polymer obtained by the copolymerization of butadiene and methacrylic acid, in the proportions of 65 mol per mol percent of butadiene and 35 mol percent of methacrylic acid. A coating mixture was prepared therefrom composed of the following:

2.7 grams of polymer in the form of latex at 27% solids,
2.7 grams of silver halide grains prepared in the form of a dispersion as described in Example 1,
11 ml. of water, and
0.5 ml. of tetrasodium-N-(1,2-dicarboxyethyl)-N-octadecyl sulfosuccinamate.

A stable composition was obtained which composition was coated onto a film support using a doctor blade in a thickness of 0.006 inch. The coating was fumed for 10 seconds after its formation. Setting of the coating occurred and drying in a current of warm dry air produced no distortion or flow. The total solids of the coating mixture used as 32.9%.

We claim:

1. A method for the rapid application of coatings to a non-porous, non-water absorbent surface which comprises applying thereto, at an acid pH, a coating of a latex, of less than 1.0 micron particle size, resulting from the emulsion polymerization of a hydrophobic ethylenically unsaturated monomer and a carboxyl containing monomer, the latter in sufficient amount to supply enough carboxyl to impart alkali solubility to the copolymer which latex contains 12–60% of the copolymer and immediately after applying the coating, fuming with nitrogenous alkaline gas whereby setting of the coating on the surface occurs.

2. A method for the rapid application of silver halide emulsion coatings to a non-porous, non-water absorbent surface which comprises applying thereto, at an acid pH, a coating of a silver halide photographic emulsion in which a latex, of less than 1.0 micron particle size, resulting from the emulsion polymerization of a hydrophobic ethylenically unsaturated monomer and a carboxyl containing monomer, the latter in sufficient amount to supply enough carboxyl to impart alkali solubility to the copolymer which latex contains 12–60% of the copolymer, acts as the carrier for the silver halide therein and immediately after applying the photographic emulsion coating to the surface, fuming with nitrogenous alkaline gas whereby setting of the coating on the surface occurs.

3. In the preparation of photographic products the application to a non-porous, non-water absorbent surface of a coating, at an acid pH, of a latex of less than 1.0 micron particle size, resulting from the emulsion polymerization of a hydrophobic ethylenically unsaturated monomer and a carboxyl containing monomer the latter in sufficient amount to impart alkali solubility to the copolymer which latex contains 12–60% of the copolymer and immediately after applying the coating, fuming with nitrogenous alkaline gas whereby rapid setting of the coating on the surface occurs.

4. In the preparation of photographic products the application to a non-porous, non-water absorbent surface, at an acid pH, of a coating of a latex of less than 1.0 micron particle size of ethyl acrylate-methacrylic acid copolymer resulting from an emulsion polymerization preparation in which the carboxyl content is sufficient to impart alkali solubility thereto which latex contains 12–60% of the copolymer and immediately after applying the coating, fuming with nitrogenous alkaline gas whereby rapid setting of the coating on the surface occurs.

5. In the preparation of photographic products the application to a surface, at an acid pH, of a coating of a latex of less than 1.0 micron particle size of alkyl methacrylate-methacrylic acid copolymer resulting from an emulsion polymerization preparation in which the carboxyl content is sufficient to impart alkali solubility thereto which latex contains 12–60% of the copolymer and immediately after applying the coating, fuming with nitrogenous alkaline gas whereby rapid setting of the coating on the surface occurs.

6. In the preparation of photographic products the application, at an acid pH, to a non-porous, non-water absorbent surface of a coating of a latex having a particle size below 1.0 micron of butadiene-methacrylic acid copolymer resulting from an emulsion polymerization preparation, the carboxyl being present in sufficient amount to impart alkali solubility to the copolymer which latex contains 12–60% of the copolymer and immediately after applying the coating, fuming with nitrogenous alkaline gas whereby rapid setting of the coating on the surface occurs.

7. In the preparation of photographic products the application, at an acid pH, to a non-porous, non-water absorbent surface of a coating of a photographic silver halide emulsion in which the silver halide has as a carrier therefor a latex having a particle size below 1.0 micron resulting from the emulsion polymerization of a hydrophobic ethylenically unsaturated monomer and a carboxyl containing monomer in sufficient amount to supply enough carboxyl to impart alkali solubility to the copolymer which latex contains 12–60% of the copolymer and immediately after applying the coating, fuming with ammonia gas whereby rapid setting of the coating on the surface occurs.

8. A method for the rapid application of coatings to a non-porous, non-water absorbent surface which comprises applying thereto, at an acid pH, a coating of a latex having a particle size below 1.0 micron of ethyl acrylate-methacrylic acid copolymer resulting from an emulsion polymerization preparation, the carboxyl being present in sufficient amount to impart alkali solubility thereto which latex contains 12–60% of the copolymer and immediately after applying the coating, fuming with ammonia gas whereby rapid setting of the coating on the surface occurs.

References Cited in the file of this patent

UNITED STATES PATENTS

| | | |
|---|---|---|
| 2,710,815 | Young et al. | June 14, 1955 |
| 2,748,029 | Spear et al. | May 29, 1956 |
| 2,756,163 | Herrick et al. | July 24, 1956 |
| 2,772,166 | Fowler | Nov. 27, 1956 |
| 2,996,405 | Van Campen | Aug. 15, 1961 |